March 19, 1929.                J. J. GILBERT                1,705,913
                        HIGH FREQUENCY SUBMARINE CABLE
                            Filed Oct. 30, 1926
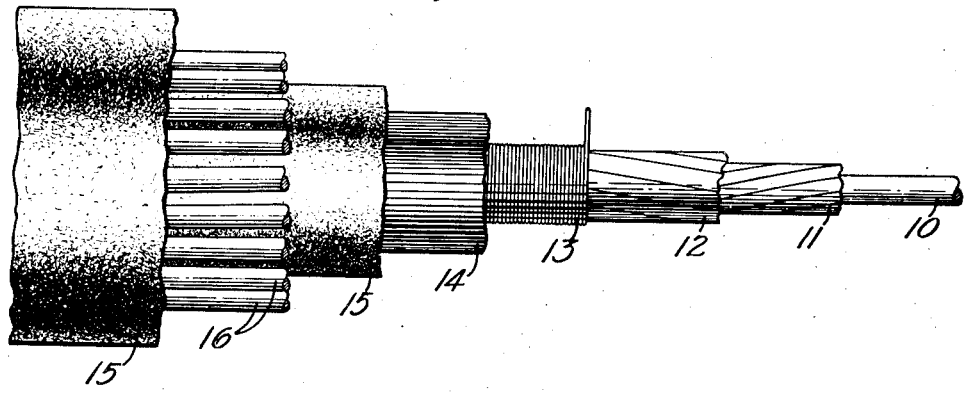
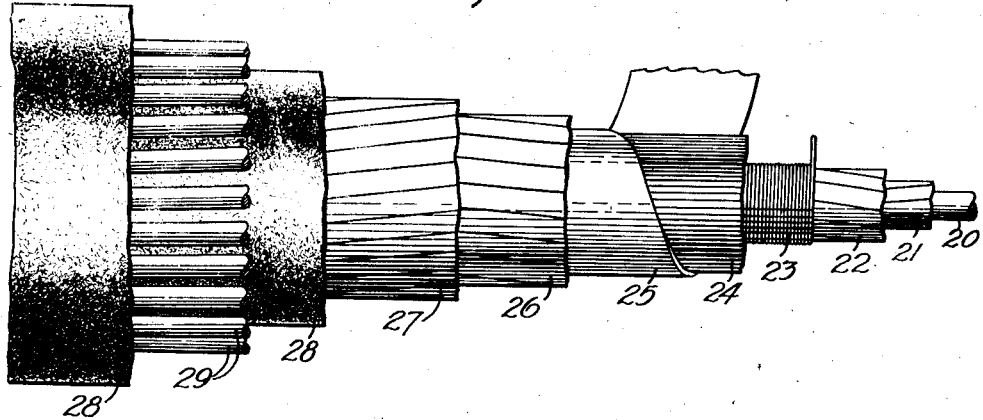
Inventor:
John J. Gilbert
by E. W. Griggs
Attorney Patented Mar. 19, 1929.

1,705,913

UNITED STATES PATENT OFFICE.

JOHN J. GILBERT, OF PORT WASHINGTON, NEW YORK, ASSIGNOR TO BELL TELEPHONE LABORATORIES INCORPORATED, OF NEW YORK, N. Y., A CORPORATION OF NEW YORK.

HIGH-FREQUENCY SUBMARINE CABLE.

Application filed October 30, 1926. Serial No. 145,116.

This invention relates to signaling conductors and more particularly to conductors for submarine telephone cables and other high frequency submarine cables.

The general object of this invention is the reduction of energy losses due to eddy currents induced in the conductors when carrying varying or alternating electric currents.

This object is attained in a specific preferred embodiment of this invention by surrounding the central conductor with two layers of conductors wound spirally in opposite directions, in place of the single layer heretofore generally used, and so designed that the magnetic fields set up by the current components in the oppositely spiralled conductors in planes perpendicular to the axis of the central conductor practically neutralize each other. The central conductor is therefore substantially free from magnetic induction capable of causing eddy currents therein.

Whenever a submarine telephone cable, or other high frequency submarine cable, is provided with a return conductor in the form of a spiral wire or ribbon, as in cables now in use, eddy currents induced in other metallic portions of the cable, it has been found, may be the cause of considerable loss of signaling energy. In accordance with a second feature of this invention this effect is avoided by making the metallic return path in the form of two oppositely pitched spiral conductors designed to eliminate this effect.

A more detailed description of the invention follows and is illustrated in the accompanying drawings.

Fig. 1 is a side elevation of a cable showing successive portions laid bare, having oppositely wound surrounds in which the return conducting path is provided by the armoring and the sea water.

Fig. 2 is a side elevation of a modified form of cable in which the return conducting path is provided by oppositely spiralled conducting tapes within the cable structure.

The usual type of conductor employed in submarine cables consists of a solid central wire surrounded by a number of tapes or wires called "surrounds" wound spirally or helically in one layer around the central wire. The signalling current in the conductor divides between the central portion and the surrounds in approximately inverse proportion to their respective resistances, although at high frequencies the proportion of current carried by the surrounds is somewhat higher than this value due to skin effect in the conductor.

Although the central wire and surrounds are in contact at a large number of points the contact resistance is large enough to prevent the central wire shunting adjacent turns of the surrounds to any considerable extent. The surrounds can be considered as constituting a solenoid and the current in the surrounds can be resolved into two components, one flowing parallel to the axis of the conductor, and a second flowing perpendicular to the axis of the conductor in parallel circular paths having their centers at the axis. The magnitude of this circular component of current relative to the total current in the conductor depends on the lay of the surrounds, being approximately proportional to the cosine of the angle of advance of the surrounds and also, as has been pointed out, on the relative resistance of the central wire and the surrounds. The circular current component gives rise to a magnetic field within the conductor, parallel to its axis, the variation of which results in the induction of eddy currents in the central wire which flow in circular paths perpendicular to the axis of the conductor.

These eddy currents give rise to an energy loss, the effect of which can best be considered as an increase in the effective resistance of the conductor. This increment of effective resistance is substantially proportional to the square of the frequency of the current, and to the fourth power of the diameter of the central wire, and depends upon the square of the ratio of the circular component of the current to the total current carried by the conductor.

In the higher range of audio-frequencies and in the carrier range,—for example, in the range of frequencies extending upward from about 1500 cycles per second—the increment of effective resistance due to the above cause is sufficient to appreciably increase the attenuation constant of the cable, and it is desired on this account to design the conductor so as to reduce this increment to a minimum.

In the arrangement shown in Fig. 1 a central conductor 10 is surrounded by the oppositely spiralled conductors or surrounds 11 and 12 which in turn are surrounded by loading material 13, insulating material 14, and protective coverings of jute and armor, 15 and 16, respectively. All of the core conductors in this cable are combined to form one insulated electrical path. The surrounds spiralling the central conductor in opposite directions are proportioned in cross-section, such as by using surrounds of different thickness, to allow for the fact that at the higher frequencies the distribution of current through a conductor is not strictly uniform. By this means not only are the magnetic fields, set up by the circular components of the current in the two layers, neutralized by each other so that the resultant magnetc field in the central conductor is practically zero, but also the diameter of the central conductor is considerably reduced. While only two oppositely wound spiral conductors are shown, a larger number may be employed, if desired, provided that they are so arranged that the combined magnetic field set up by the resultant circular components of current is zero. The armor wires should have a very long lay and be made of steel heavily copper plated or of non-magnetic highly conducting material, as described in applicant's copending application Serial No. 585,619, filed September 1, 1922. High conductivity of the armor wires, particularly in the material near their surface, is desirable, because a large part of the return current is carried by the armoring rather than by the sea water, and because for high frequencies most of the current is carried near the surface of the wires. The arrangement shown in Fig. 2 is similar in principle to that shown in Fig. 1 but provides two separate electrical paths within the cable structure. A central conductor 20 is wound with the oppositely spiralled surrounds 21 and 22, around which is loading material 23, insulating material 24 protected mechanically and against injury from the teredo by a thin and closely wound tape 25 of such material as brass. The outer conducting path is formed by oppositely wound spiral conductors 26 and 27 which in turn may be protected by outer coverings of jute and armor wires, 28 and 29, respectively. The outer oppositely spiralled conductors are wound with a long lay and are so proportioned and arranged that the resultant magnetic field, set up by the circular component of the currents flowing through them is substantially zero and consequently practically all eddy current losses are eliminated. In proportioning the cross-section of the oppositely spiralled conductors, whether they are associated with the central conductor or used on a return conductor, allowance is made for the fact that at the higher frequencies the distribution of current through a conductor is not strictly uniform. In this arrangement the outer conductor may be made of a plurality of layers of oppositely spiralled conductors, provided they are so designed that the circular components of the currents produce a zero resultant magnetic effect.

As an example of the make-up of the core conductor which might be used in a submarine telephone cable, such a conductor might be made up of a solid copper wire 0.162 inch in diameter, and two layers of oppositely wound copper tape surrounds each approximately 0.016 inch thick, each layer comprising six tapes wound with a lay or pitch of 2.5 inches.

A modified two-path cable can be made in accordance with the principles of this invention by using with the central conductor only one set of spiralled conductors or surrounds wound directly on the central conductor, all forming one electrical path, and another set of spiralled conductors forming the return conductor wound in the same direction as the surrounds on the central conductor, since the current in two sets of spiralled conductors flows in opposite directions, and so proportioned as to neutralize the magnetic effect caused by the circular component of the current flowing in the surrounds.

What is claimed is:

1. A conductor for transmitting high frequency alternating currents comprising a solid central conductor and two layers of current carrying conductors laid spirally about said central conductor in direct contact therewith and with opposite lay.

2. A two path high frequency submarine signaling cable having a central conductor and a plurality of spirally wound conductors, said spirally wound conductors being divided into two electrically insulated groups, the conductors of each group being oppositely wound and the current carrying capacity of the oppositely spirally wound conductors of each group being such that the circular current components are equally divided and neutralize the magnetic fields due to the said circular current components.

3. A high frequency submarine signaling cable having a central conductor and oppositely spiralled conductors wound about said central conductor forming one current carrying path, an insulating material covering said conductors, and a second set of oppositely spiralled conductors forming a return current carrying path within the structure of the said cable, all of said spirally wound conductors being so wound and having such conductivity that the magnetic field set up by the circular component of the current in one spiralled conductor is neutralized by that of another spiralled conductor, thereby substantially eliminating eddy current losses in the several conductors due to the circular component of the current.

4. A high frequency submarine signaling cable having a central conductor wound with two layers of oppositely spiralled conductors, the said spiralled conductors being so conductively proportioned and positioned that the magnetic fields set up by the circular components of the current in each of said spirally wound conductors are opposing and of substantially equal values, insulating covering for said central conductor and associated spiralled conductors, and wire armoring, the said wire armoring being of high conductivity and wrapped around the cable with as long a lay as is mechanically practicable.

5. A high frequency submarine signaling cable having a central conductor and two sets of spiralled conductors so conductively proportioned and positioned that the circular component of the current flowing in the said sets of spiralled conductors produces substantially no magnetic induction and resulting eddy currents in the said central conductor.

In witness whereof, I hereunto subscribe my name this 28th day of October, A. D., 1926.

JOHN J. GILBERT.